US011906287B2

(12) United States Patent
Eki et al.

(10) Patent No.: US 11,906,287 B2
(45) Date of Patent: Feb. 20, 2024

(54) SHAPE PROFILE MEASUREMENT DEVICE, AND SHRINK-PACKAGING MACHINE

(71) Applicant: SICK K.K., Tokyo (JP)

(72) Inventors: Tatsuya Eki, Tokyo (JP); Kou Ikeda, Tokyo (JP); Yuji Ogusu, Tokyo (JP)

(73) Assignee: SICK K.K., Tokyo (JP)

( * ) Notice: Subject to any disclaimer, the term of this patent is extended or adjusted under 35 U.S.C. 154(b) by 0 days.

(21) Appl. No.: 17/848,649

(22) Filed: Jun. 24, 2022

(65) Prior Publication Data

US 2023/0003507 A1 Jan. 5, 2023

(30) Foreign Application Priority Data

Jul. 5, 2021 (JP) .................................. 2021111402

(51) Int. Cl.
*G01B 11/25* (2006.01)
*B65B 57/02* (2006.01)
(Continued)

(52) U.S. Cl.
CPC .............. *G01B 11/25* (2013.01); *B65B 57/02* (2013.01); *B65B 59/001* (2019.05); *B65B 59/02* (2013.01);
(Continued)

(58) Field of Classification Search
CPC ..... G01B 11/043; G01B 11/25; G01B 11/245; G01B 11/2522; G01B 11/2433;
(Continued)

(56) References Cited

U.S. PATENT DOCUMENTS 5,299,410 A 4/1994 Freeman
11,123,944 B1 * 9/2021 Hoffman ............... B65B 53/063
(Continued)

FOREIGN PATENT DOCUMENTS

EP 0645309 A1 * 3/1995 ........... B65B 59/001
EP 3323734 A1 5/2018
(Continued)

*Primary Examiner* — Michael P LaPage
(74) *Attorney, Agent, or Firm* — Nath, Goldberg & Meyer; Jerald L. Meyer

(57) ABSTRACT

A shape profile measurement device includes: a light projector and a light receiver arranged facing each other; a belt conveyor for conveying an object for measurement; and a calculation unit. The light projector includes a plurality of light-emitting portions arranged in an array direction, and each emits substantially parallel measurement light. The light receiver includes a plurality of light-receiving portions arranged in the array direction facing the plurality of light-emitting portions, and each receives the measurement light emitted from a corresponding light-emitting portion. The light-receiving portions output a signal indicating a light intensity of the received measurement light. The calculation unit acquires the signal of the light receiver when the object is at a plurality of different movement-direction positions between the light-emitting portions and the light-receiving portions, and obtains a shape profile on the basis of the signal acquired and information relating to the plurality of movement-direction positions.

5 Claims, 6 Drawing Sheets

(51) Int. Cl.
　　　*G01B 11/04*　　　(2006.01)
　　　*G01B 11/24*　　　(2006.01)
　　　*B65B 59/02*　　　(2006.01)
　　　*B65B 59/00*　　　(2006.01)
　　　*B65B 57/00*　　　(2006.01)
　　　*G01B 11/245*　　(2006.01)

(52) U.S. Cl.
　　　CPC ........ *G01B 11/043* (2013.01); *G01B 11/2433* (2013.01); *B65B 57/00* (2013.01); *B65B 2210/04* (2013.01); *G01B 11/245* (2013.01); *G01B 11/2522* (2013.01)

(58) Field of Classification Search
　　　CPC ..... B65B 57/02; B65B 57/00; B65B 2210/04; B65B 9/026; B65B 53/063; B65B 59/001; B65B 59/02
　　　See application file for complete search history.

(56) References Cited

U.S. PATENT DOCUMENTS

| | | | |
|---|---|---|---|
| 2008/0020916 A1 | 1/2008 | Magnell | |
| 2016/0098171 A1* | 4/2016 | Lancaster, III | B65B 59/003 |
| | | | 715/835 |
| 2018/0079537 A1* | 3/2018 | Lancaster, III | B65B 11/045 |
| 2018/0273218 A1 | 9/2018 | Lancaster, III et al. | |

FOREIGN PATENT DOCUMENTS

| | | | | |
|---|---|---|---|---|
| JP | 5215031 A | | 4/1977 | |
| JP | 2004513847 | * | 5/2004 | ........... B65B 43/465 |
| JP | 2007121132 A | | 5/2007 | |
| WO | WO-2018236687 A1 | * | 12/2018 | ........... B31D 5/0073 |

* cited by examiner

[Fig. 1]
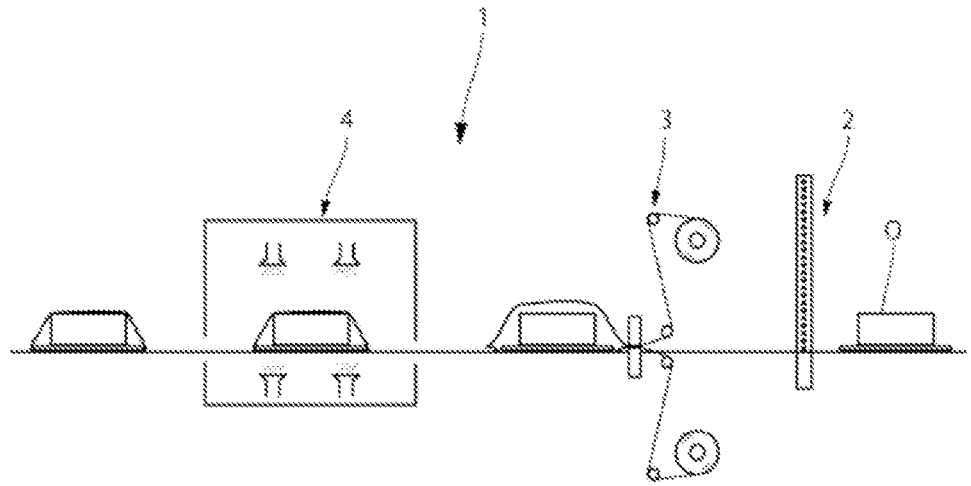
[Fig. 2]
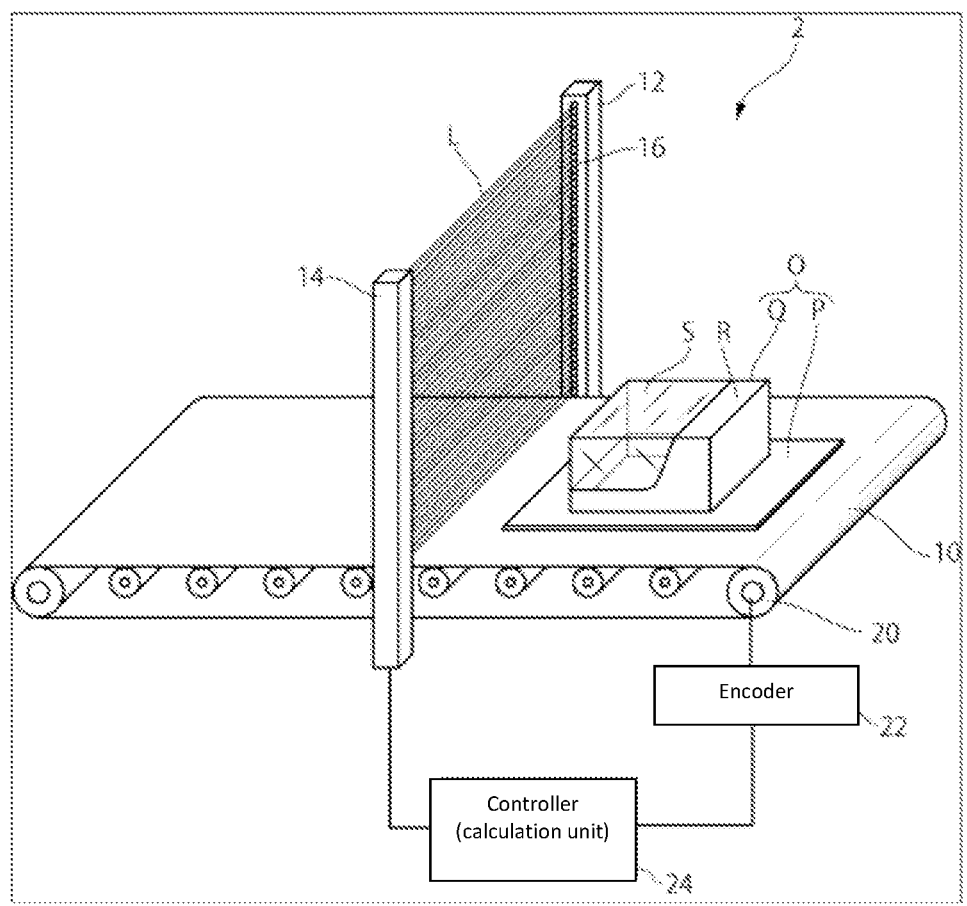

[Fig. 3]
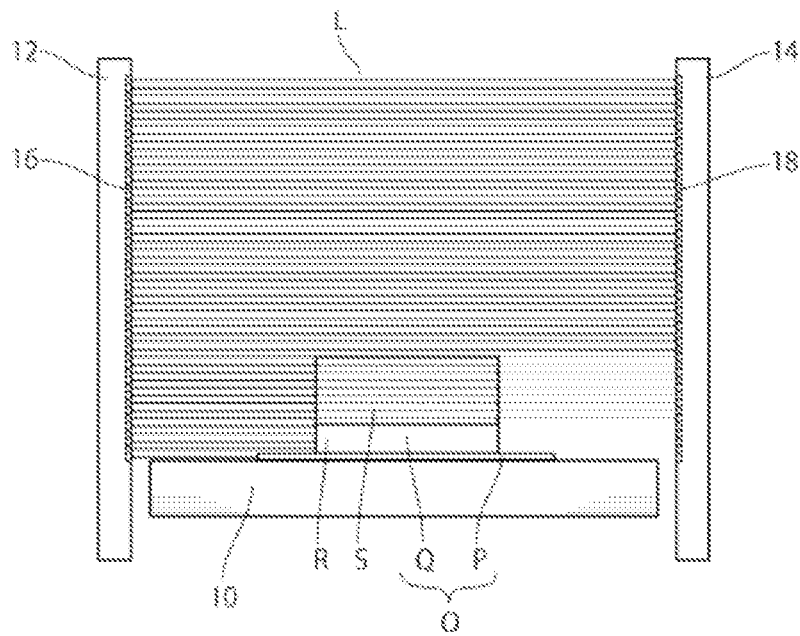
[Fig. 4]
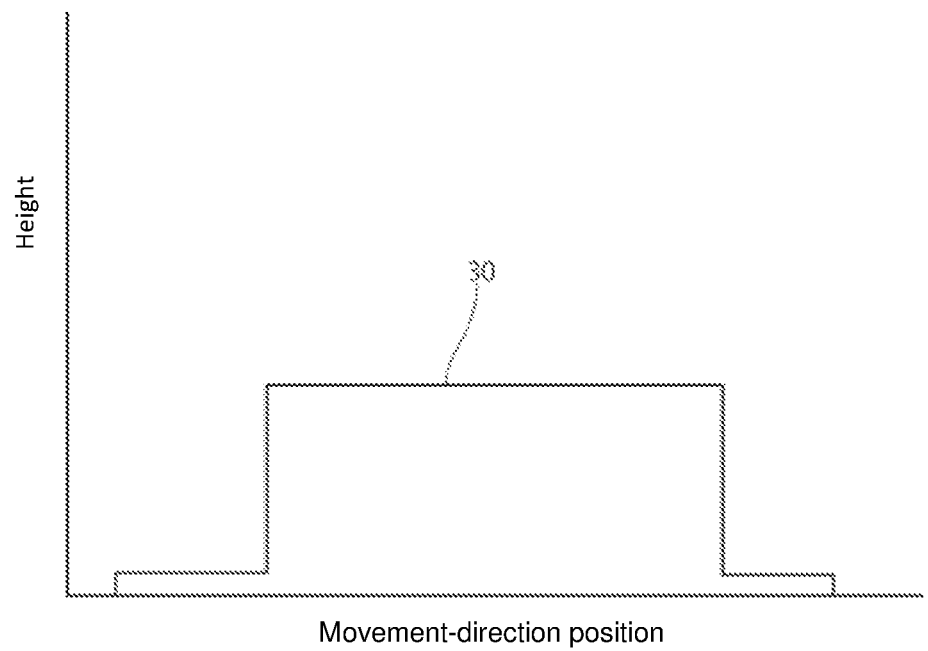
Movement-direction position

[Fig. 5]
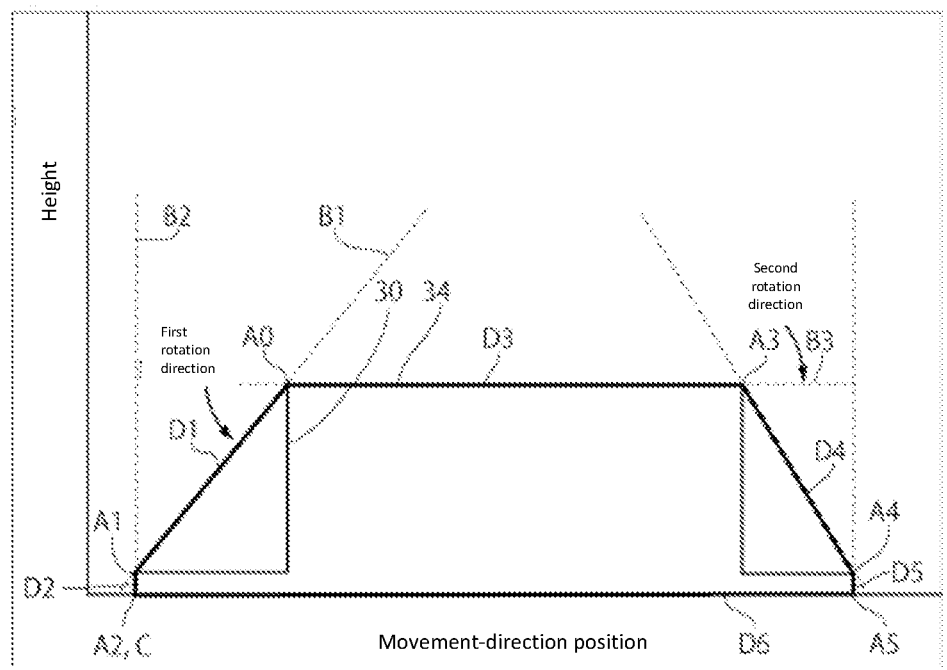
[Fig. 6]
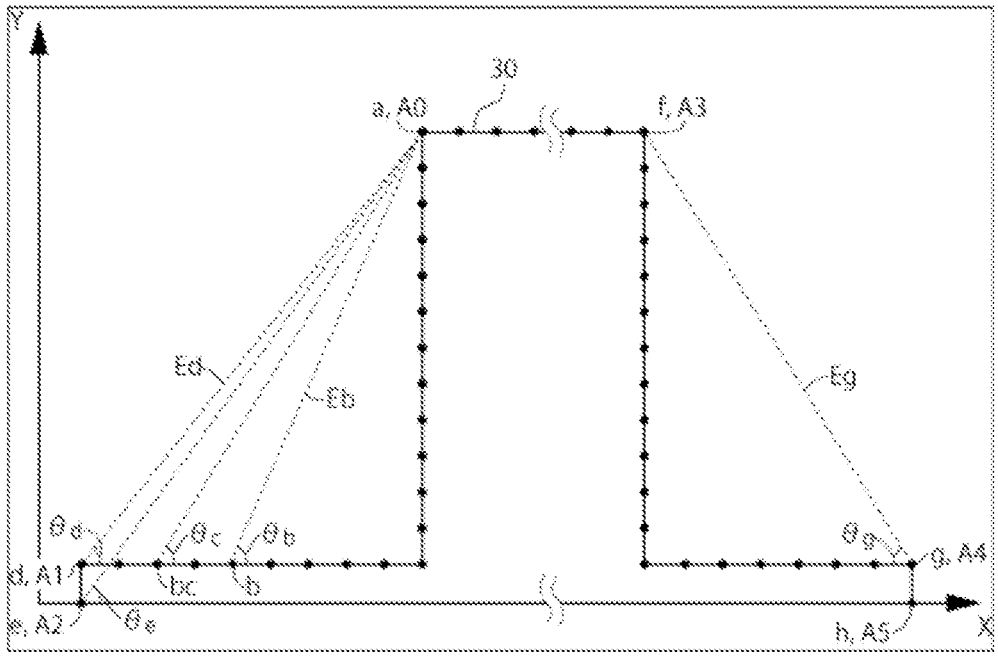

[Fig. 7]
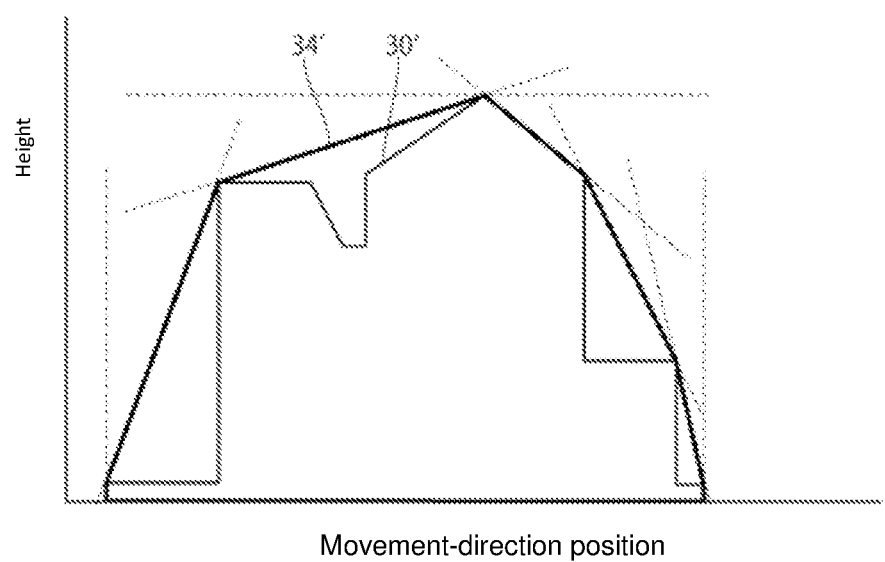
Movement-direction position

[Fig. 8]
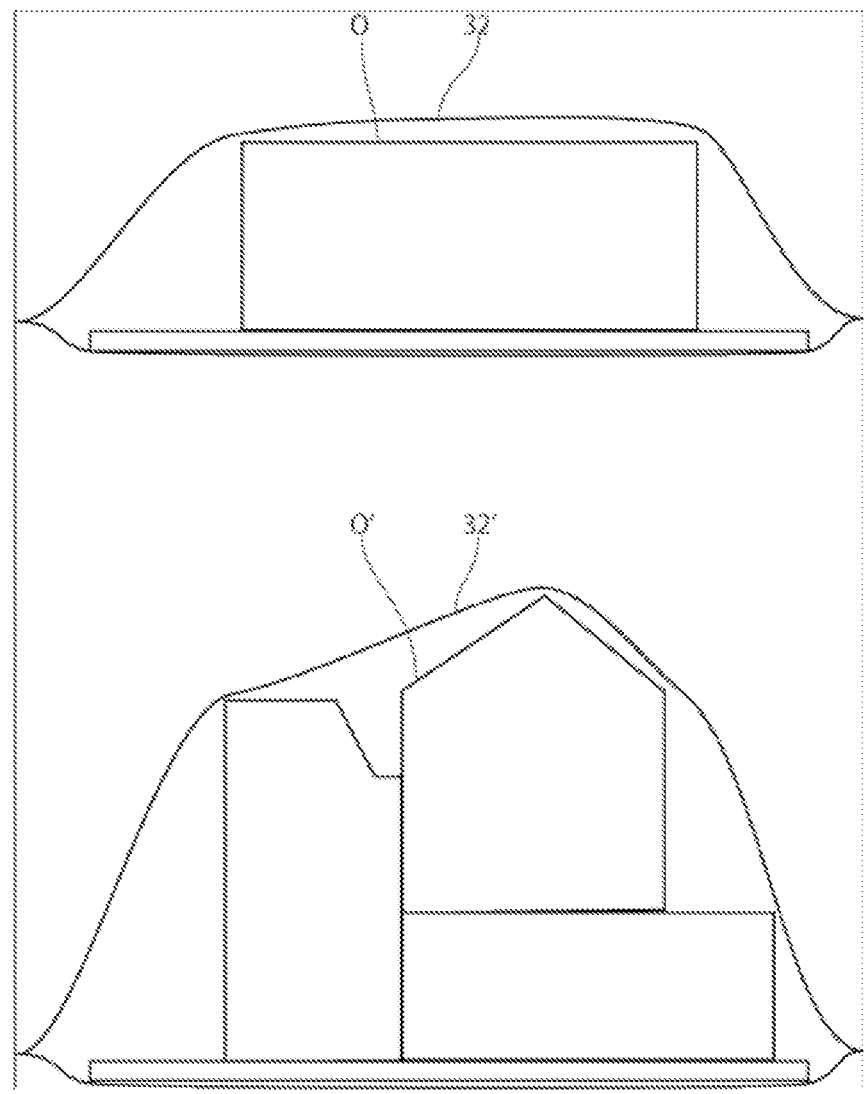

[Fig. 9]
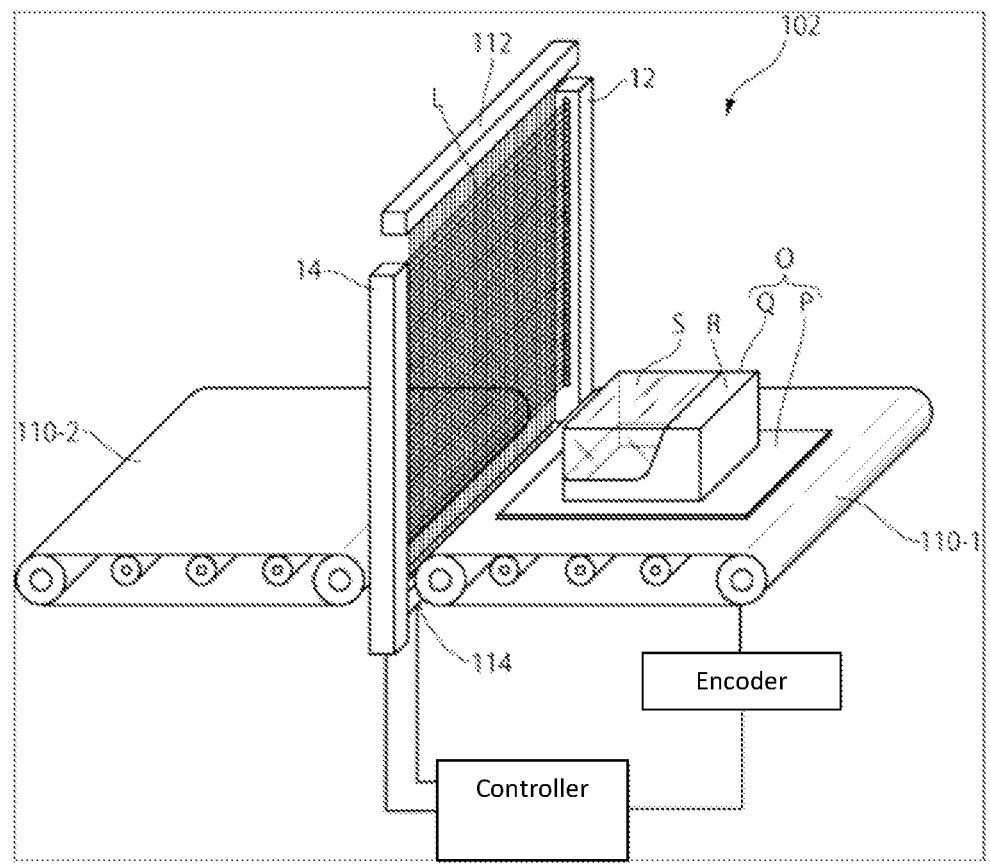

SHAPE PROFILE MEASUREMENT DEVICE, AND SHRINK-PACKAGING MACHINE

The present invention relates to a shape profile measurement device for measuring a shape profile of an object by utilizing an optical means, and to a shrink-packaging machine comprising such a shape profile measurement device.

BACKGROUND ART

Shrink-packaging machines for packaging objects having various shapes with a shrink film are known. When products are shipped by Internet mail order in particular, the products are placed on a base paper, and each product on its base paper is shrink-packaged (JP 2018-79971 A). The products which are shrink-packaged have various shapes and sizes, and multiple products may also be shrink-packaged together, but objects of different sizes are normally shrink-packaged by a single shrink-packaging machine.

When a product is shrink-packaged, the object for packaging, including the base paper and the product, is wrapped in a shrink film formed into a cylindrical shape, and the shrink film is then heated and caused to contract. The object for packaging is packaged and held by means of the contracted shrink film.

SUMMARY OF THE INVENTION

When objects of different sizes are packaged using a single shrink-packaging machine as described above, the size of the shrink film for packaging the objects for packaging needs to be set at a size capable of wrapping the largest envisaged object. However, when a small object is shrink-packaged using a large shrink film, there are risks of an excessive amount of contraction of the shrink film, causing a large number of creases which detract from the appearance, or sometimes the amount of contraction of the film is insufficient so the object cannot be appropriately held. Furthermore, more shrink film than necessary is used, which is also wasteful in terms of material. Under such circumstances, it would be desirable to detect in advance the size of the object to be shrink-packaged. Furthermore, the objects to be shrink-packaged may also include those which are formed either partially or fully from a transparent material, and objects which absorb light and reflect virtually no light, etc., and it would also be desirable to be able to accurately measure the size of such objects.

In light of the problems mentioned above, the object of the present invention lies in providing a shape profile measurement device capable of measuring a shape profile even of objects that transmit or absorb light, and a shrink-packaging machine comprising such a shape profile measurement device.

That is to say, the present invention provides a shape profile measurement device comprising:
- a light projector having a plurality of light-emitting portions arranged in a predetermined array direction, each of the light-emitting portions emitting substantially parallel measurement light;
- a light receiver having a plurality of light-receiving portions arranged in the predetermined array direction facing the plurality of light-emitting portions, each of the light-receiving portions receiving the measurement light emitted from a corresponding light-emitting portion among the plurality of light-emitting portions, and outputting a signal indicating a light intensity of the received measurement light;
- a movement mechanism for causing an object for measurement to move in relation to the light projector and the light receiver so that the object for measurement passes between the plurality of light-emitting portions and the plurality of light-receiving portions; and
- a calculation unit for acquiring the signal of the light receiver when the object for measurement is at a plurality of different movement-direction positions between the plurality of light-emitting portions and the plurality of light-receiving portions, and for obtaining a shape profile of the object for measurement on the basis of the signal acquired and information relating to the plurality of movement-direction positions, wherein the calculation unit determines that the object for measurement is present on a propagation path on which the measurement light propagates when the light intensity of the measurement light received by the light-receiving portions drops to or below a predetermined threshold in relation to an initial intensity before measurement.

This shape profile measurement device is configured to obtain the shape profile of the object for measurement on the basis of the magnitude of light intensity of measurement light received by the light-emitting portions. If the object for measurement is opaque and does not transmit light, the measurement light striking the object for measurement is blocked without reaching the corresponding light-receiving portion, so the light intensity of the measurement light at that light-receiving portion is substantially zero, and as a result it is possible to detect that the object for measurement is present at a position where the measurement light propagates. In this case, the shape profile measurement device does not utilize reflection of light that has struck the object for measurement, and therefore the shape profile measurement is unaffected when the object for measurement has absorbed the light. If the object for measurement is transparent, on the other hand, the measurement light striking the object for measurement is transmitted by the object for measurement and reaches the light-receiving portion, but the measurement light is reflected or scattered to some extent as it passes through the object for measurement, so the light intensity of the measurement light reaching the light-receiving portion decreases to some extent. The shape profile measurement device detects the presence of the object for measurement by a drop in the light intensity of the measurement light received by the light-receiving portions, to or below a predetermined threshold, so the shape profile can be measured even in the case of a partially or fully transparent object.

Specifically, the shape profile measurement device may further comprise:
- a movement amount measurement means for measuring an amount of movement of the object for measurement conveyed by means of the movement mechanism, and
- the information relating to the plurality of movement-direction positions may constitute the amount of movement of the object for measurement measured by the movement amount measurement means.

Furthermore, based on the shape profile, the calculation unit may execute a calculation to obtain a minimum length of a film required for wrapping the object for measurement in said film.

In this case, the calculation unit may execute:
- a calculation to obtain a starting vertex on the shape profile, which is where, when a predetermined straight line approaches the shape profile, that straight line initially makes contact; and a calculation to obtain an adjacent vertex in a first rotation direction in relation to an arbitrary vertex on the shape profile, wherein, when a straight line passing through said arbitrary vertex is rotated in the first rotation direction about said arbitrary vertex within a plane of the shape profile, that straight line initially makes contact with the shape profile outside of said arbitrary vertex, and the calculation to obtain the minimum length may comprise: obtaining a first adjacent vertex by executing the calculation to obtain an adjacent vertex in the first rotation direction in relation to the starting vertex, and obtaining a first line segment joining the starting vertex and the first adjacent vertex as a portion of the minimum length.

Additionally, the calculation unit may further execute:

a calculation to obtain an adjacent vertex in a second rotation direction in relation to an arbitrary vertex on the shape profile, wherein, when a straight line passing through said arbitrary vertex is rotated in the second rotation direction, which is opposite to the first rotation direction, about said arbitrary vertex within the plane of the shape profile, that straight line initially makes contact with the shape profile outside of said arbitrary vertex, and the calculation to obtain the minimum length may comprise: obtaining a second adjacent vertex by executing the calculation to obtain an adjacent vertex in the second rotation direction in relation to the starting vertex, and obtaining a second line segment joining the starting vertex and the second adjacent vertex as a portion of the minimum length.

Additionally, the calculation to obtain the minimum length may comprise:

executing a calculation to further obtain an adjacent vertex in the first rotation direction in relation to the adjacent vertex obtained by the calculation to obtain an adjacent vertex in the first rotation direction, repeating the calculation to obtain an adjacent vertex in the first rotation direction until the adjacent vertex obtained in the calculation to obtain an adjacent vertex in the first rotation direction reaches an end point or the starting vertex of the shape profile, and obtaining line segments successively joining each adjacent vertex as at least a portion of the minimum length.

The present invention further provides a shrink-packaging machine comprising: the abovementioned shape profile measurement device;

a film wrapping device for forming a shrink film into a cylindrical shape and wrapping the object for measurement using the shrink film; and a heating device for heating the shrink film to cause contraction thereof, and placing the object for measurement in a state in which it is packaged by the shrink film, wherein a peripheral length of the cylindrical shrink film formed by means of the film wrapping device is determined on the basis of the minimum length obtained by means of the calculation unit.

Embodiments of the shape profile measurement device and the shrink-packaging machine according to the present invention will be described below with reference to the appended drawings.

BRIEF DESCRIPTION OF THE DRAWINGS

FIG. 1 is a schematic diagram of a shrink-packaging machine according to an embodiment of the present invention.

FIG. 2 is an oblique view showing a shape profile measurement device of the shrink-packaging machine in FIG. 1.

FIG. 3 is a diagram showing a state in which a shape profile of an object for packaging is being measured by the shape profile measurement device in FIG. 2.

FIG. 4 is a diagram showing the shape profile measured by the shape profile measurement device.

FIG. 5 is a diagram showing a method for obtaining a film minimum length in relation to the shape profile in FIG. 4.

FIG. 6 is a diagram showing a calculation method for obtaining an adjacent vertex by means of a controller (calculation unit).

FIG. 7 is a diagram showing the shape profile of a different object for packaging measured by means of the shape profile measurement device in FIG. 2, and the film minimum length with respect to the measured shape profile.

FIG. 8 is a diagram showing a state in which objects for packaging have been wrapped in a cylindrical shrink film by means of a film wrapping device of the shrink-packaging machine in FIG. 1.

FIG. 9 is an oblique view showing a shape profile measurement device according to a different embodiment of the present invention.

MODE FOR IMPLEMENTING THE INVENTION

As shown in FIG. 1, a shrink-packaging machine 1 according to an embodiment of the present invention comprises: a shape profile measurement device 2 for measuring a shape profile of an object O for packaging (object for measurement); a film wrapping device 3 for wrapping the periphery of the object O for packaging with a shrink film; and a heating device 4 for heating the shrink film to cause contraction thereof.

As shown in FIG. 2, the shape profile measurement device 2 comprises: a belt conveyor (movement mechanism) 10; and a light projector 12 and a light receiver 14 arranged facing each other with the belt conveyor 10 interposed therebetween. The belt conveyor 10 conveys the object O for packaging, which has been placed thereon, at a set speed. It should be noted that the object O for packaging depicted comprises a base paper P and an article Q placed thereon. The light projector 12 comprises a plurality of light-emitting portions 16 arranged in an array direction, which is a vertical direction, and each of the light-emitting portions 16 emits substantially parallel measurement light L in a horizontal direction. The light receiver 14 comprises a plurality of light-receiving portions 18 (which are not visible in FIG. 2) arranged in the same array direction facing the plurality of light-emitting portions 16 of the light projector 12. Each of the light-receiving portions 18 receives the measurement light L emitted from a corresponding light-emitting portion 16, and outputs a signal indicating a light intensity of the received measurement light L. The shape profile measurement device 2 further comprises a controller (calculation unit) 24 connected to an encoder (movement amount measurement means) 22 for measuring a rotation speed of a drive roller 20 of the belt conveyor 10, and to the light receiver 14.

A conveyance speed of the belt conveyor 10 is set at 0.5 m/s in the shape profile measurement device 2 of this embodiment, and the light-emitting portions 16 of the light projector 12 and the light-receiving portions 18 of the light receiver 14 are each arranged at a pitch of 5 mm. Furthermore, the controller 24 receives and acquires signals from the light receiver 14 at intervals of 10 ms, while detecting, on the basis of output of the encoder 22, an amount of movement of the object O for packaging placed on the belt conveyor 10.

When the object O for packaging conveyed by the belt conveyor 10 passes between the light projector 12 and the light receiver 14, a portion of the measurement light L propagating therebetween is blocked by the object O for packaging. The article Q of the object O for packaging depicted has an opaque part R and a transparent part S. FIG. 3 shows a state in which the transparent part S is positioned between the light projector 12 and the light receiver 14. The measurement light L emitted from the light-emitting portion 16 at the very bottom is blocked as it strikes the base paper P of the object O for packaging, and therefore does not reach the corresponding light-receiving portion 18. The measurement light L emitted from the light-emitting portions 16 second to fifth from the bottom is likewise blocked as it strikes the opaque part R of the article Q of the object O for packaging, and is therefore not received by the corresponding light-receiving portions 18. On the other hand, the measurement light L emitted from the light-emitting portions 16 sixth to fourteenth from the bottom strikes the transparent part S of the article Q and, although a portion thereof is reflected and scattered, most of it is transmitted by the transparent part S and received by the corresponding light-receiving portions 18. There is nothing to block the measurement light L emitted from the fifteenth and subsequent light-emitting portions 16 from reaching the light-receiving portions 18, so that light is received by the corresponding light-receiving portions 18 at an unchanged light intensity. Each of the light-receiving portions 18 outputs a signal commensurate with the light intensity of the received measurement light L.

The signals from the light-receiving portions 18 are sent to the controller 24, which determines the vertical size of the object O for packaging on the basis of the signals received. Specifically, when the light intensity of the measurement light L received by the light-receiving portions 18 drops to or below a predetermined threshold in relation to an initial intensity before measurement, the controller 24 determines that the object O for packaging is present on a propagation path on which the measurement light L propagates. The predetermined threshold may be set at any value, but is 95% in this embodiment, for example. That is to say, when the measurement light L received by the light-receiving portions 18 has dropped by 5% or more in relation to the initial intensity, the object O for packaging is deemed to be present on the propagation path of the measurement light L.

In the example depicted, the measurement light L emitted from the first to fifth light-emitting portions 16 is completely blocked by the object O for packaging, and therefore does not reach the corresponding light-receiving portions 18. Accordingly, the light intensity of the measurement light L received by the first to fifth light-receiving portions 18 is 0% in relation to the initial intensity, and the first to fifth light-receiving portions 18 output a signal indicating that the light intensity has dropped to 0%. The measurement light L emitted from the sixth to fourteenth light-emitting portions 16 reaches the corresponding light-receiving portions 18 with a slight drop in light intensity due to reflection and scattering, etc. when the measurement light L is transmitted by the transparent part S of the object O for packaging. Accordingly, the light intensity of the measurement light L received by the sixth to fourteenth light-receiving portions 18 drops in relation to the initial intensity, reaching around 90%, for example. In this case, the measurement light L reaches the light-receiving portions 18, but the light intensity of the measurement light L received by the light-receiving portions 18 has dropped to 90%, which is below the 95% threshold, and therefore the controller 24 determines that the object O for packaging is present on the propagation path on which the measurement light L propagates. The measurement light L emitted from the fifteenth and subsequent light-emitting portions 16 reaches the corresponding light-receiving portions 18 without being blocked by the object O for packaging, so the light intensity of the measurement light L received by the fifteenth and subsequent light-receiving portions 18 is substantially 100%. The light intensity of that measurement light L has not dropped to or below the predetermined threshold (95%), so the controller 24 determines that the object O for packaging is not present on the conveyance path on which the measurement light L propagates. The controller 24 thus determines that the height of the object O for packaging at the position depicted is around 7 cm, which is the same level as the fifteenth light-emitting portion 16 and light-receiving portion 18.

The height measurement as described above is continuously executed at intervals of 10 ms with respect to the object O for packaging being conveyed at a speed of around 0.5 m/s. The amount of movement of the object O for packaging per 10 ms is around 5 mm, and therefore the height of the object O for packaging is measured at a plurality of movement-direction positions at intervals of around 5 mm. The controller 24 ascertains a movement-direction distance between signals acquired from the light receiver 14 on the basis of the amount of movement of the object O for packaging measured by means of the encoder 22, and obtains a shape profile 30 such as shown in FIG. 4. The shape profile measurement device 2 can thus measure this shape profile 30 regardless of whether the object O for packaging is light absorbent or light transmissive. It should be noted that the amount of movement of the object O for packaging measured by means of the encoder 22 is utilized as information relating to the movement direction of the object O for packaging in this embodiment, but, provided that the conveyance speed of the belt conveyor 10 is kept fixed and the time intervals of the height measurement are always fixed time intervals, it is also possible to utilize a given amount of movement calculated from the fixed conveyance speed and time intervals as the information relating to the movement direction, without using the encoder 22. Alternatively, if the conveyance speed of the belt conveyor 10 is not fixed, a first height measurement may be performed, then a subsequent height measurement may be performed when the amount of movement measured by means of the encoder 22 has reached a given magnitude (e.g., 5 mm) from a movement-direction position when the first height measurement was performed.

The controller 24 of the shape profile measurement device 2 has a further function of obtaining a minimum length of a film 32 required for wrapping the object O for packaging having the measured shape profile 30 with said film 32. As shown in FIG. 5, when the minimum length is obtained, a vertex at the highest position of the shape profile 30 is first of all specified and set as a starting vertex A0. The starting vertex A0 is the point furthest above a bottom surface of the shape profile 30, in other words, it is the point where, when a horizontal straight line approaches the shape profile 30 from above, that straight line initially makes contact. In the example depicted, an upper surface of the shape profile 30 is horizontal, so there are multiple points on the upper surface which are furthest above the bottom surface, but in such a case, a point at a corner on a front side (the left-hand side as seen in the drawing) may be used as the starting vertex A0, for example. Next, when a straight line B1 passing only through the starting vertex A0 and not passing through the shape profile 30 outside of the starting vertex A0 is rotated in a first rotation direction (anticlockwise as seen in the drawing) about the starting vertex A0 within a plane of the shape profile 30, a point at which that straight line B1 initially makes contact with the shape profile 30 outside of the starting vertex A0 is specified, and that point is set as a first adjacent vertex A1. In the same way, when a straight line B2 passing only through the first adjacent vertex A1 is rotated in the first rotation direction about the first adjacent vertex A1, the point of initial contact is specified, and that point is set as a second adjacent vertex A2. The same calculation is repeated until the adjacent vertex obtained reaches an end point C of the shape profile 30, i.e., a point next to or contacting the belt conveyor 10. In the example depicted, the second adjacent vertex A2 is already the end point C of the shape profile 30. Next, when a straight line B3 passing only through the starting vertex A0 is rotated in a second rotation direction (clockwise as seen in the drawing) opposite to the first rotation direction, a point at which that straight line B3 initially makes contact outside of the starting vertex A0 is specified, and that point is set as a third adjacent vertex A3. The same calculation is repeated to obtain a fourth adjacent vertex A4 and a fifth adjacent vertex A5. The length of a polygonal line 34 formed by successively joining the starting vertex A0 and the first to fifth adjacent vertices A1-A5 by first to sixth line segments D1-D6 is the minimum length for wrapping the shape profile 30 with the film 32. It should be noted that here, the vertex at which, when the horizontal straight line approaches from above, that straight line initially makes contact is set as the starting vertex A0, but the starting vertex A0 may equally be a point at a different position. For example, a point at a lower end may be set as the starting vertex A0, and adjacent vertices may be obtained in succession. Furthermore, the adjacent vertices A1, A2 may be obtained by means of a method in which a straight line is rotated in the first rotation direction, after which a method in which a straight line is further rotated in the first rotation direction in relation to A2 is further performed, the adjacent vertices A5, A4, A3 are obtained in succession, then the calculation to obtain the adjacent vertices may be terminated at the time when the adjacent vertex obtained is the same point as the starting vertex A0. Additionally, the method for obtaining each of the vertices has been described here by a procedure that involves rotating straight lines, but such a calculation does not necessarily have to be performed in practice, and a different calculation method may also be used to obtain the same vertices.

For example, the starting vertex and each of the adjacent vertices may also be obtained by means of a calculation such as below. As shown in FIG. 6, a movement direction is X and a height direction is Y, and a data point where Y is greatest is specified from among data points that constitute the shape profile 30 (the black circles in the drawing). There are multiple data points where Y is greatest in the case of the shape profile 30, so a data point a among these where X is smallest is set as the starting vertex A0. Data points where the value of X is the same as or smaller than that of the starting vertex A0 are then extracted, and angles of line segments joining the starting vertex A0 and each of the data points are respectively obtained. For example, an angle θb of a line segment Eb joining the starting vertex A0 ($X_A$, $Y_A$) and a data point b ($X_b$, $Y_b$) may be obtained by means of the following formula.

$$\theta_b = \left| \tan^{-1}\left(\frac{Y_A - Y_b}{X_A - X_b}\right) \right|$$

Angles θ of line segments in relation to all of the other data points extracted are obtained in the same way. When angles θb, θc, θd, θe for the representative data points b, c, d, e are actually obtained, they are found to be approximately 67.4°, approximately 63.4°, approximately 56.3°, and approximately 58.4°, respectively. The data point where the angle θ is smallest is obtained from among all of the extracted data points, and that data point is set as the next adjacent vertex. In the case of the shape profile 30 depicted, the angle θd of a line segment Ed with the data point d is the smallest, so the data point d is set as the first adjacent vertex A1. In order to obtain the second adjacent vertex A2, data points where the value of X is the same as or smaller than that of the data point d constituting the first adjacent vertex A1 are then extracted, and angles of line segments joining the data point d and each of the extracted data points are calculated. The data point e is the only data point extracted in the case of the shape profile 30, so the data point e is set as the second adjacent vertex A2. Following this, the adjacent vertex to the right of the starting vertex A0 is obtained. Data points where the value of X is greater than that of the starting vertex A0 are extracted, and angles of line segments joining the starting vertex A0 and each of those data points are obtained in the same way. There are a large number of data points where the angle θ is a minimum of 0° in the shape profile 30, but, among those, a data point f furthest from the starting vertex A0 is set as the third adjacent vertex A3. Data points where the value of X is the same as or greater than that of the third adjacent vertex A3 are then extracted, angles of line segments joining the third adjacent vertex A3 and each of those data points are respectively obtained, and the data point having the smallest angle is specified. An angle θg in relation to a line segment Eg with a data point g is the smallest, so the data point g is set as the fourth adjacent vertex A4. A data point h is set as the fifth adjacent vertex A5 in the same way. It should be noted that such a calculation to set the point having the smallest angle in relation to a particular data point as the following adjacent vertex is substantially the same as setting the point of initial contact when a straight line is rotated as the following adjacent vertex, as described above, and the results of both calculations are in principle the same.

FIG. 7 shows a shape profile 30' when a different object for packaging is measured by means of the same method, and a polygonal line 34' indicating the minimum length obtained with respect to the shape profile 30'.

When the measurement performed by the shape profile measurement device 2 has been completed, the object O for packaging is then wrapped with the shrink film 32 by means of the film wrapping device 3. The film wrapping device 3 forms the cylindrical shrink film 32 by welding two shrink films, and the object O for packaging is wrapped inside the two films. The peripheral length of the cylindrical shrink film 32 in this case is determined on the basis of the minimum length obtained by means of the shape profile measurement device 2. That is to say, the peripheral length of the cylindrical shrink film 32 is sufficient to wrap the object O for packaging prior to thermal contraction, but is not excessively large, and it is adjusted to a size such that the shrink film 32 has the minimum length as a result of a suitable amount of contraction when it has thermally contracted. As shown in FIG. 8, a shrink film 32' for packaging an object O' for packaging which is larger than the object O for packaging is therefore larger than the shrink film 32 for the object O for packaging. The size of the cylindrical shrink film 32 formed by the film wrapping device 3 thus differs according to the size and shape of the object O for packaging.

The object O for packaging wrapped with the cylindrical shrink film 32 then passes through the heating device 4. The heating device 4 heats the shrink film 32 by applying hot air to the shrink film 32 from the surrounding area. The shrink film 32 thermally contracts as a result, and the object O for packaging is placed in a state in which it is wrapped and held without any slackness, thereby completing the shrink packaging.

In the shrink-packaging machine 1, the size of the shrink film 32 is thus determined on the basis of the minimum length obtained by means of the shape profile measurement device 2, so it is possible to employ an appropriate size of shrink film 32 according to the size and shape of the object O for packaging.

As shown in FIG. 9, a shape profile measurement device 102 according to a different embodiment of the present invention further comprises a second light projector 112 and a second light receiver 114 arranged vertically facing each other, in addition to the light projector 12 and the light receiver 14 arranged facing each other in the width direction. Furthermore, the movement mechanism comprises two belt conveyors 110-1, 110-2, and the measurement light L propagating in a vertical direction propagates through the area between the two belt conveyors 110-1, 110-2. The width-direction shape profile of the object O for packaging can also be measured by means of the second light projector 112 and the second light receiver 114 which are vertically arranged. The shape profile measurement device 102 is therefore capable of simultaneously measuring the shape profile in the width direction, in addition to the shape profile in the height direction.

Embodiments of the present invention were described above, but the present invention is not limited to those embodiments. For example, another form of conveyor, such as a roller conveyor or a chain conveyor may also be used as the movement mechanism for conveying the object for packaging (object for measurement), rather than a belt conveyor, or another known type of movement mechanism for causing the object for packaging to move may also be used. Furthermore, the movement mechanism may also be configured to cause the light projector and the light receiver to move in relation to the object for packaging while the object for packaging is static, rather than the object for packaging being moved. Additionally, rather than the movement mechanism causing the object for packaging to move at a fixed speed relative to the light projector and the light receiver, it is also possible for the object for packaging to be moved a predetermined distance and then temporarily stopped, and for the shape profile to be measured at that position while the object for packaging is stopped. The usage of the shape profile measurement device is not limited to measuring the shape profile of an object for packaging which is shrink-packaged, and it may also be used for measuring the shape profile of other articles. It should be noted that the specific numerical values given in the description of the embodiment are merely illustrative, and they may be modified, as appropriate, according to the envisaged use and required performance, etc.

KEY TO SYMBOLS

1 Shrink-packaging machine
2 Shape profile measurement device
3 Film wrapping device
4 Heating device
10 Belt conveyor (movement mechanism)
12 Light projector
14 Light receiver
16 Light-emitting portion
18 Light-receiving portion
20 Drive roller
22 Encoder (movement amount measurement means)
24 Controller (calculation unit)
30, 30' Shape profile
32, 32' Shrink film
34, 34' Polygonal line
102 Shape profile measurement device
110-1 Belt conveyor
110-2 Belt conveyor
112 Second light projector
114 Second light receiver
A0 Starting vertex
A1-A5 First to fifth adjacent vertices
B1, B2, B3 Straight line
C End point
D1-D6 First to sixth line segments
Eb, Ed, Eg Line segment
L Measurement light
O, O' Object for packaging (object for measurement)
P Base paper
Q Article
R Opaque part
S Transparent part
a-h Data point
θa-θg Angle

The invention claimed is:
1. A shape profile measurement device comprising:
a light projector having a plurality of light-emitting portions arranged in a predetermined array direction, each of the light-emitting portions emitting substantially parallel measurement light;
a light receiver having a plurality of light-receiving portions arranged in the predetermined array direction facing the plurality of light-emitting portions, each of the light-receiving portions receiving the measurement light emitted from a corresponding light-emitting portion among the plurality of light-emitting portions, and outputting a signal indicating a light intensity of the received measurement light;
a movement mechanism for causing an object for measurement to move in relation to the light projector and the light receiver so that the object for measurement passes between the plurality of light-emitting portions and the plurality of light-receiving portions; and
a calculation unit for acquiring the signal of the light receiver when the object for measurement is at a plurality of different movement-direction positions between the plurality of light-emitting portions and the plurality of light-receiving portions, and for obtaining a shape profile of the object for measurement on the basis of the signal acquired and information relating to the plurality of movement-direction positions, wherein the calculation unit determines that the object for measurement is present on a propagation path on which the measurement light propagates when the light intensity of the measurement light received by the light-receiving portions drops to or below a predetermined threshold in relation to an initial intensity before measurement, wherein, based on the shape profile, the calculation unit executes a calculation to obtain a minimum length of a film required for wrapping the object for measurement in said film, wherein the calculation unit further executes:
a calculation to obtain a starting vertex on the shape profile, which is where, when a predetermined straight line approaches the shape profile, that straight line initially makes contact; and
a calculation to obtain an adjacent vertex in a first rotation direction in relation to an arbitrary vertex on the shape profile, wherein, when a straight line passing through said arbitrary vertex is rotated in the first rotation direction about said arbitrary vertex within a plane of the shape profile, that straight line initially makes contact with the shape profile outside of said arbitrary vertex, and wherein the calculation to obtain the minimum length of the film comprises:
obtaining a first adjacent vertex by executing the calculation to obtain an adjacent vertex in the first rotation direction in relation to the starting vertex, and
obtaining a first line segment joining the starting vertex and the first adjacent vertex as a portion of the minimum length.

2. The shape profile measurement device according to claim 1, further comprising a movement amount measurement means for measuring an amount of movement of the object for measurement conveyed by means of the movement mechanism, wherein the information relating to the plurality of movement-direction positions constitutes the amount of movement of the object for measurement measured by the movement amount measurement means.

3. The shape profile measurement device according to claim 1, wherein the calculation unit further executes:

a calculation to obtain an adjacent vertex in a second rotation direction in relation to an arbitrary vertex on the shape profile, wherein, when a straight line passing through said arbitrary vertex is rotated in the second rotation direction, which is opposite to the first rotation direction, about said arbitrary vertex within the plane of the shape profile, that straight line initially makes contact with the shape profile outside of said arbitrary vertex, and the calculation to obtain the minimum length comprises:
obtaining a second adjacent vertex by executing the calculation to obtain an adjacent vertex in the second rotation direction in relation to the starting vertex, and
obtaining a second line segment joining the starting vertex and the second adjacent vertex as a portion of the minimum length.

4. The shape profile measurement device according to claim 1, wherein the calculation to obtain the minimum length comprises:
executing a calculation to further obtain an adjacent vertex in the first rotation direction in relation to the adjacent vertex obtained by the calculation to obtain an adjacent vertex in the first rotation direction;
repeating the calculation to obtain an adjacent vertex in the first rotation direction until the adjacent vertex obtained in the calculation to obtain an adjacent vertex in the first rotation direction reaches an end point or the starting vertex of the shape profile; and
obtaining line segments successively joining each adjacent vertex as at least a portion of the minimum length.

5. A shrink-packaging machine comprising:
a shape profile measurement device according to claim 1;
a film wrapping device for forming a shrink film into a cylindrical shape and wrapping the object for measurement using the shrink film; and
a heating device for heating the shrink film to cause contraction thereof, and placing the object for measurement in state in which it is packaged by the shrink film,
wherein a peripheral length of the cylindrical shrink film formed by means of the film wrapping device is determined on the basis of the minimum length obtained by means of the calculation unit.

* * * * *